(12) United States Patent
Li et al.

(10) Patent No.: US 10,222,019 B1
(45) Date of Patent: Mar. 5, 2019

(54) LIGHT MODULE OF LASER HEADLAMP

(71) Applicant: TAN DE TECH CO., LTD., Yunlin County (TW)

(72) Inventors: Tsung Hsien Li, Yunlin County (TW); Chung Chiang Pan, Yunlin County (TW); Cheng Chih Lai, Yunlin County (TW); Chao Pai Lee, Yunlin County (TW)

(73) Assignee: Tan De Tech Co., Ltd., Douliu (TW)

( * ) Notice: Subject to any disclaimer, the term of this patent is extended or adjusted under 35 U.S.C. 154(b) by 0 days.

(21) Appl. No.: 15/966,945

(22) Filed: Apr. 30, 2018

(51) Int. Cl.
| | |
|---|---|
| *G03H 1/00* | (2006.01) |
| *F21S 41/16* | (2018.01) |
| *F21V 8/00* | (2006.01) |
| *F21S 41/125* | (2018.01) |
| *G02B 27/09* | (2006.01) |
| *G02B 27/30* | (2006.01) |
| *G02B 27/10* | (2006.01) |

(52) U.S. Cl.
CPC ............ *F21S 41/16* (2018.01); *F21S 41/125* (2018.01); *G02B 6/002* (2013.01); *G02B 27/0955* (2013.01); *G02B 27/1006* (2013.01); *G02B 27/30* (2013.01)

(58) Field of Classification Search
CPC ..... F21S 41/16; G02B 27/1006; G02B 27/30; G02B 6/002
See application file for complete search history.

(56) References Cited

U.S. PATENT DOCUMENTS

2013/0250381 A1* 9/2013 Toko ..................... G02B 5/32
359/19

\* cited by examiner

*Primary Examiner* — Joseph L Williams
(74) *Attorney, Agent, or Firm* — Wang Law Firm, Inc.

(57) ABSTRACT

A light module of a headlamp includes a laser device, a liquid crystal panel, a light transmitting device, a wavelength converting device, and a projection device in sequence. The laser device has at least a laser emitter to project laser rays to the liquid crystal panel. The light transmitting device transmits the laser rays from the liquid crystal panel to the wavelength converting device. The wavelength converting device transforms the laser beam into white light and project out through the projection device. A heat sink is attached to the wavelength converting device to dissipate the heat.

8 Claims, 3 Drawing Sheets

LIGHT MODULE OF LASER HEADLAMP

BACKGROUND OF THE INVENTION

1. Technical Field

The invention relates to a headlamp of a vehicle, and more particularly to a light module of a headlamp.

2. Description of Related Art

Illumination of vehicles is very important issue to driving safety. It is not only to provide a bright light, but also to increase the safety when one is driving in the dark as well as saving power.

In early days, light bubbles are used to be the light modules of the headlamps, and then high-intensity discharge lamps (HID lamps) are produced in the market that produces light by passing electricity through ionized xenon gas at high pressure. It produces a bright white light that closely mimics natural sunlight, which extends its applications into the film, and daylight simulation industries, and then LED headlamps are invented. The newest headlamp is laser headlamp. Compare with LED headlamps, the laser headlamp has a distance of visual cognition 1.5 times longer than that of the LED headlamp, 1/10 in size, and 2.5 times of luminance, so that the laser headlamps are smaller and lighter than any conventional headlamps.

However, there still are some unsolved problems in the laser headlamps, including reliability in anti-vibration and heat-resist, heat dissipation, and so on. The technicians are working hard to solve these problems.

BRIEF SUMMARY OF THE INVENTION

In view of the above, the primary objective of the present invention is to provide a lamp module of a laser headlamp, which has a small size and well heat dissipation.

In order to achieve the objective of the present invention, a light module of a laser headlamp includes a laser device having at least a laser emitter to produce laser rays with a wavelength in a predetermined range; a liquid crystal panel receiving the laser rays from the laser emitter of the laser device, and letting the laser rays carry a predetermined image; a wavelength converting device converting the laser rays carrying the predetermined image from the liquid crystal panel into white laser rays; a heat sink attached to the wavelength converting device to dissipate heat of the wavelength converting device; and a projection lens projecting the white laser rays from the wavelength converting device onto a target.

As a result, the present invention may have a small size and well heat dissipation.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
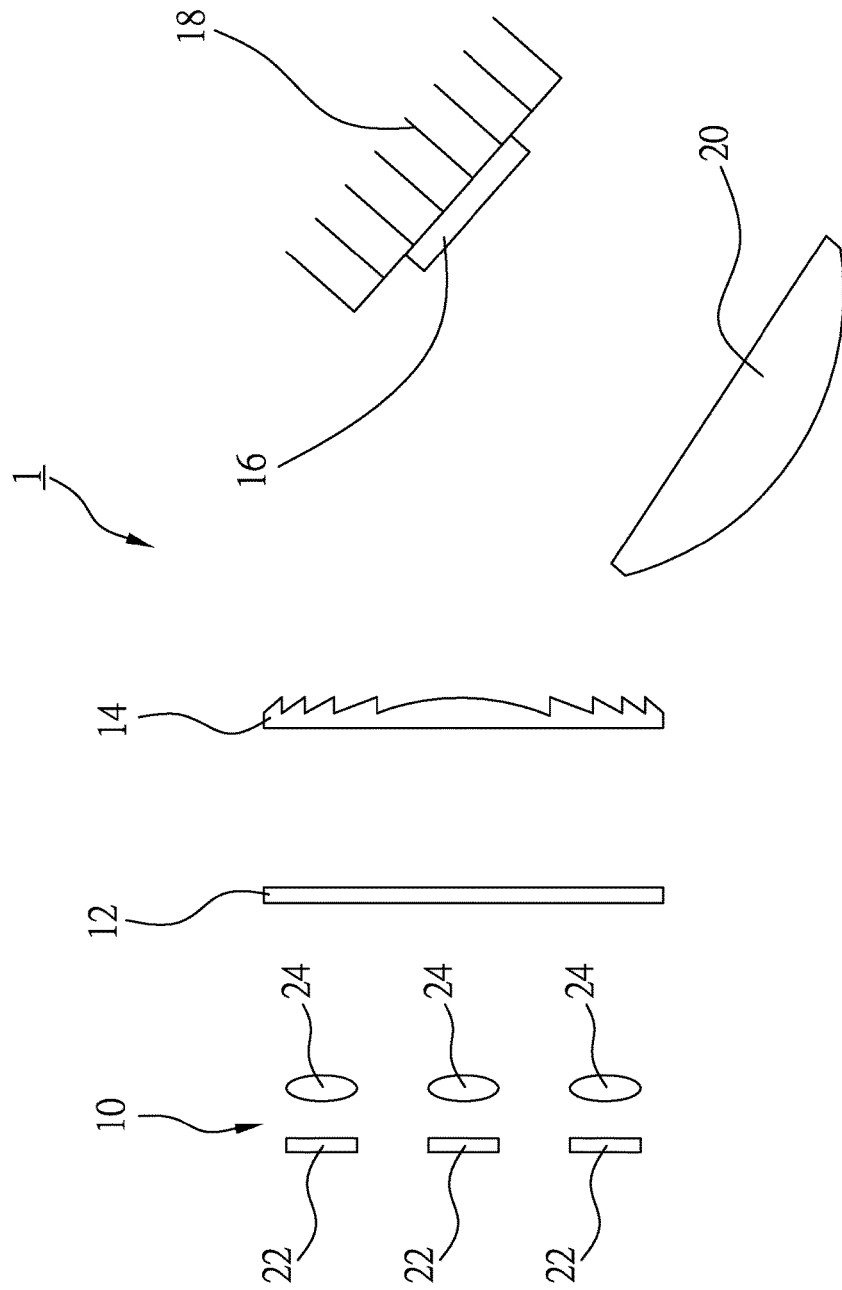
FIG. 1 is a sketch diagram of a first preferred embodiment of the present invention.

FIG. 1 shows a light module 1 of the first preferred embodiment of the present invention, which is mounted in a lase headlamp (not shown) of a vehicle, including a laser device 20, a liquid crystal panel 12, a light transmitting device 14, a wavelength converting device 16, a heat sink 18, and a projection device 20 in sequence.

The laser device 20 includes a plurality of laser emitters 22, and a plurality of collimators 24. In the first embodiment, the laser emitters 22 produce blue laser rays with a wavelength between 360 nm and 480 nm. The collimators 24 are provided in front of the laser emitters 22 respectively to collimate the laser rays, so that parallel laser rays will enter the liquid crystal panel 12 to carry a predetermined image (not shown).

Then, the collimated laser rays with the predetermined image emit to the wavelength converting device 16 through the light transmitting device 14. In the first embodiment, the light transmitting device 14 has a Fresnel lens, which has a large aperture and a short focal length without the mass and volume of material that would be required by a lens of conventional design. The Fresnel lens can capture more oblique light from a light source, thus allowing the light from a lighthouse equipped with one to be visible over greater distances.

Figure 2:
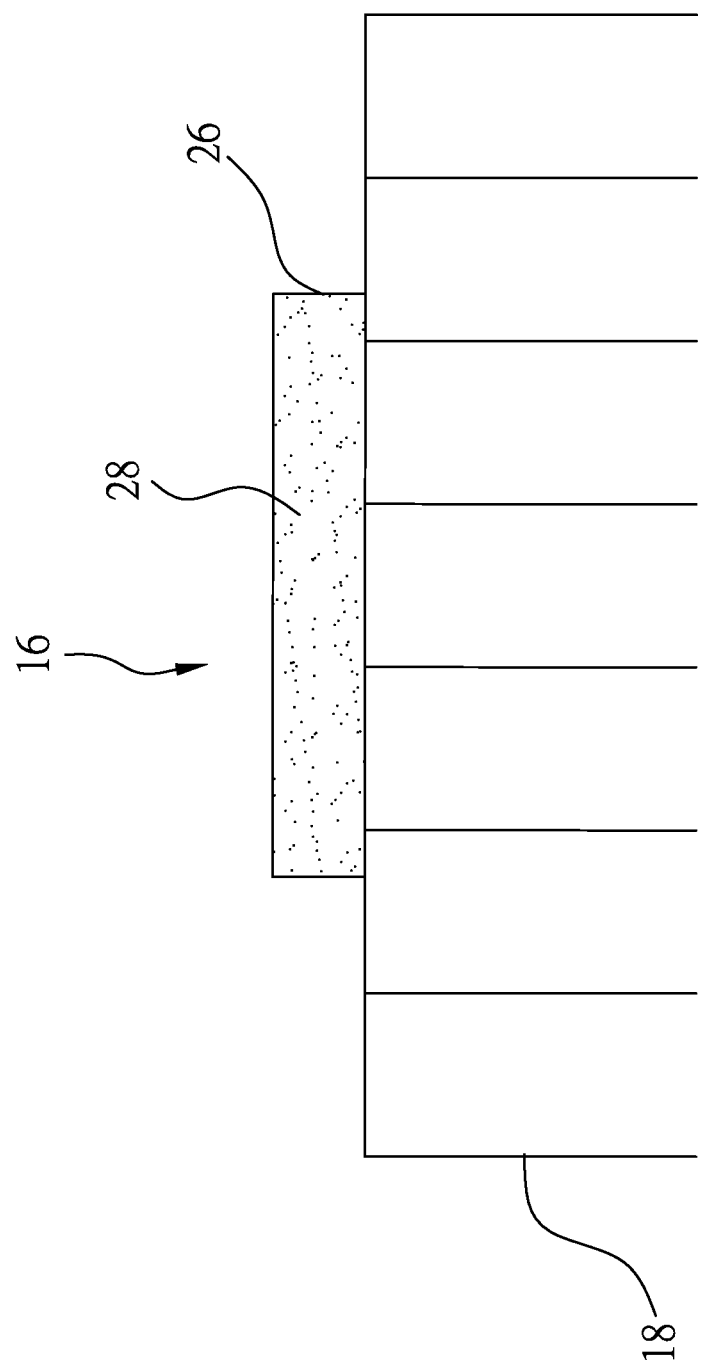
FIG. 2 is an enlarged view of the wavelength converting device of the first preferred embodiment of the present invention.

As shown in FIG. 2, the wavelength converting device 16 has a transparent block 26 containing reflective phosphors 28 therein. The reflective phosphors 28 excite the laser rays with the predetermined image and convert them into white laser rays, and then reflect them to the projection device 20. In the present embodiment, the heat sink 18 is attached to a back of the transparent block 26 of the wavelength converting device 16 to dissipate the heat of the wavelength converting device 16.

The projection device 20 has at least an optical lens, which may be a convex lens, a concave lens, a mirror, a convex mirror, a concave mirror, and a combination of the lenses, and the mirrors above. The projection device 20 projects the white laser rays from the wavelength converting device 16 onto a predetermined target (not shown).

In conclusion, the light module 1 of the laser headlamp of the first preferred embodiment provides the light transmitting device 14, the wavelength converting device 16, and the projection device 20 to transmit the laser rays of the laser device 20 that may reduce a size of the light module 1. Besides, the heat sink 18 may dissipate the heat of the wavelength converting device 16 to avoid the heat problem of the light module 1.

Figure 3:
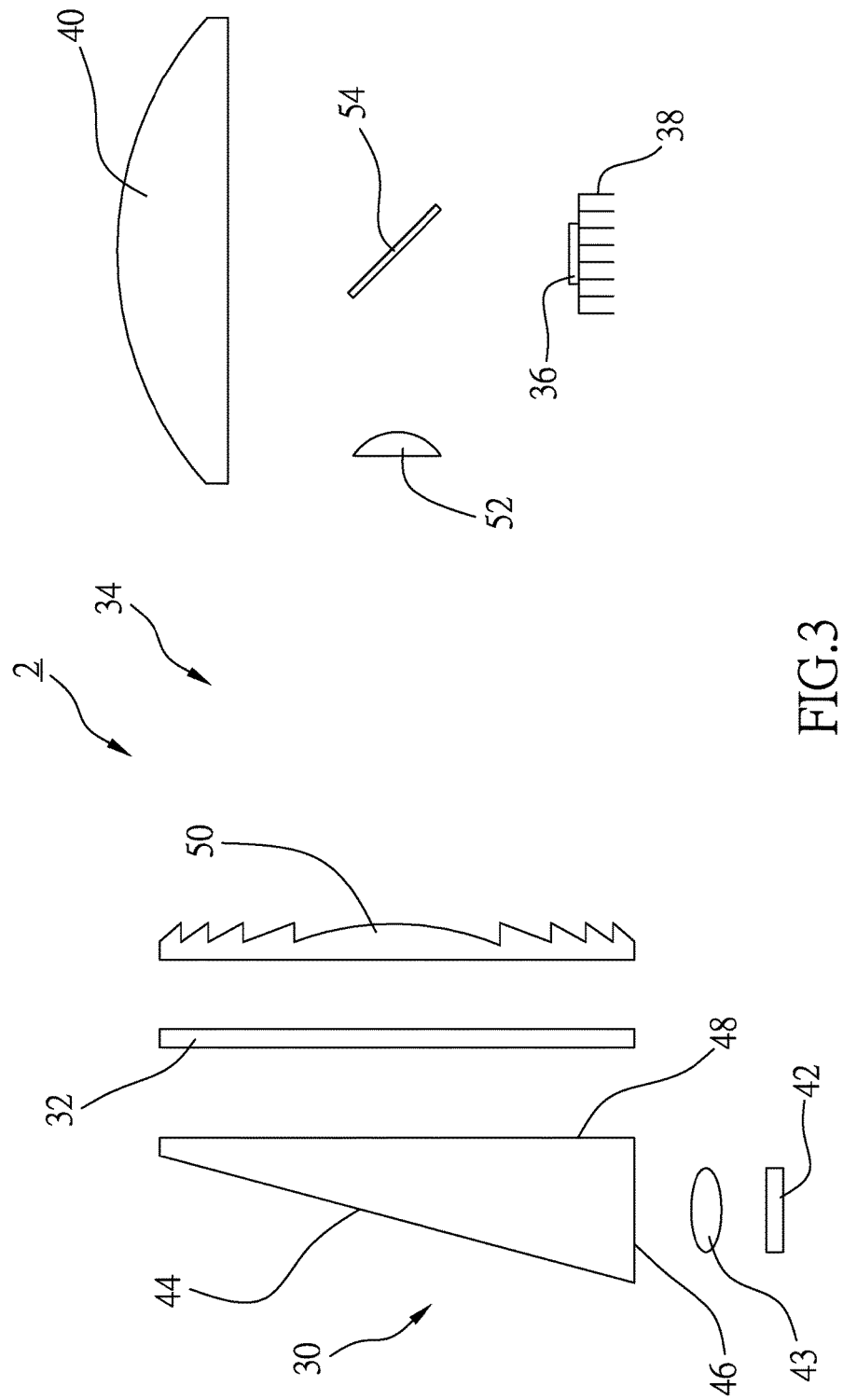
FIG. 3 is a sketch diagram of a sectional preferred embodiment of the present invention.

As shown in FIG. 3, a light module 2 of a laser headlamp of the second preferred embodiment of the present invention includes a laser device 30, a liquid crystal panel 32, a light transmitting device 34, a wavelength converting device 36, a heat sink 38, and a projection device 40 in sequence.

The laser device 30 includes a laser emitter 42, a collimator 43 and a light guide plate 44. The light guide plate 44 has an enter surface 46 and an exit surface 48 neighboring with the enter surface 46. The laser emitter 42 and the collimator 43 are provided at the enter surface 46 of the light guide plate 44. The laser emitter 42 generates point blue laser rays emitting through the collimator 43 to be collimated, and then entering the light guide plate 44 via the enter surface 46. The light guide plate 44 converts the point blue laser rays of the laser emitter 42 into an area of uniform blue laser rays emitting to the liquid crystal panel 32 via the exit surface 48 thereof to carry a predetermined image (not shown).

In the second embodiment, the light transmitting device 34 has a Fresnel lens 50, an optical lens 52, and a beam splitter 54. The uniform blue laser rays carrying the predetermined image from the liquid crystal panel 32 emit to the beam splitter 54 through the Fresnel lens 50 and the optical lens 52 in sequence. The beam splitter 54 splits the uniform blue laser rays carrying the predetermined image in two, and emits predetermined laser rays to the wavelength converting device 36.

In the second embodiment, the wavelength converting device 36, the heat sink 38, and the projection device 40 are the same as that of the first embodiment. The wavelength converting device 36 converts the blue laser rays into white laser rays, and emit the white laser rays to the projection device 40. The projection device 40 projects the white laser rays onto a target (not shown). The heat sink 38 is attached to the wavelength converting device 36 to dissipate the heat of the wavelength converting device 36.

The operation and function of the second preferred embodiment are the same as above, so we do not describe them again.

It must be pointed out that the embodiments described above are only some preferred embodiments of the present invention. All equivalent structures which employ the concepts disclosed in this specification and the appended claims should fall within the scope of the present invention.

What is claimed is:

1. A light module of a laser headlamp, comprising:
   a laser device having at least a laser emitter to produce laser rays with a wavelength in a predetermined range;
   a liquid crystal panel receiving the laser rays from the laser emitter of the laser device, and letting the laser rays carry a predetermined image;
   a wavelength converting device converting the laser rays carrying the predetermined image from the liquid crystal panel into white laser rays;
   a heat sink attached to the wavelength converting device to dissipate heat of the wavelength converting device; and
   a projection lens projecting the white laser rays from the wavelength converting device onto a target.

2. The light module of the laser headlamp of claim 1, further comprising a light transmitting device between the liquid crystal panel and the wavelength converting device to transmit the laser rays from the liquid crystal panel to the wavelength converting device.

3. The light module of the laser headlamp of claim 2, wherein the light transmitting device has a Fresnel lens.

4. The light module of the laser headlamp of claim 2, wherein the light transmitting device has a beam splitter to split the laser rays from the liquid crystal panel in two, and one of which emit to the wavelength converting device.

5. The light module of the laser headlamp of claim 1, wherein the laser device further includes a collimator to collimate the laser rays of the laser emitter.

6. The light module of the laser headlamp of claim 1, wherein the laser device further includes a light guide plate having an enter surface and an exit surface; the laser rays of the laser emitter enter the light guide plate via the enter surface to convert the laser rays of the laser emitter into an area of uniform laser rays, and then the uniform laser rays emit to the liquid crystal panel via the exit surface.

7. The light module of the laser headlamp of claim 1, wherein the wavelength converting device has a transparent block containing reflective phosphors therein.

8. The light module of the laser headlamp of claim 7, wherein the heat sink is attached to the transparent block of the wavelength converting device.

* * * * *